United States Patent [19]

Fukui

[11] 4,168,072
[45] Sep. 18, 1979

[54] SEALING MECHANISM

[75] Inventor: Kiyozumi Fukui, Gifu, Japan

[73] Assignee: Teijin Seiki Company, Limited, Osaka, Japan

[21] Appl. No.: 896,360

[22] Filed: Apr. 13, 1978

Related U.S. Application Data

[63] Continuation of Ser. No. 807,232, Jun. 16, 1977, abandoned.

[30] Foreign Application Priority Data

Jun. 23, 1976 [JP] Japan .................................. 51-74204

[51] Int. Cl.² ............................................. F16J 15/34
[52] U.S. Cl. ...................................................... 277/92
[58] Field of Search ..................................... 277/92, 81

[56] References Cited

U.S. PATENT DOCUMENTS

| | | | |
|---|---|---|---|
| 3,624,809 | 11/1971 | Beninga | 277/92 |
| 3,861,765 | 1/1975 | Follert | 277/92 |
| 3,905,607 | 9/1975 | Maguire et al. | 277/92 |

*Primary Examiner*—Robert I. Smith
*Attorney, Agent, or Firm*—Cushman, Darby & Cushman

[57] ABSTRACT

A sealing mechanism, comprises: a first member having a conical bore formed in coaxial relation with its own axis and a first face formed at the side thereof; a second member made of a metal and relatively rotatable with respect to the first member, the second member having a second face spaced from and opposing to the first face of the first member, and an annular groove recessed away from and opposing to the conical bore to have a bottom face and radially inner and outer faces connecting the bottom face and the second face; an annular floating seal assembly accommodated in the conical bore of the first member, the annular floating seal assembly including a metal seal ring having a lip portion extending radially outwardly and toward the annular groove, and a resilient annular ring disposed between the conical bore and the seal ring to urge the seal ring toward the annular groove; and a ring member made of a metal and provided in the annular groove to have a rear face in metal-to-metal contact with the bottom face of the annular groove and a fore face in sliding contact with the lip portion of the ring member to complete sealing between the first and second members during relative rotation of the first and second member.

2 Claims, 3 Drawing Figures

SEALING MECHANISM

This is a continuation of application Ser. No. 807,232, filed June 16, 1977, now abandoned.

The present invention relates to a sealing mechanism and more particularly to a sealing mechanism for sealing two relatively rotating members at their opposite faces.

In order to seal two relatively rotating members at their opposite faces, there has been conventionally proposed a sealing mechanism as seen in U.S. Pat. No. 3,905,607, filed Feb. 8, 1974 in which a first ring member is located through an annular resilient member on an end plate fixed to a roller to be pressedly and slidingly contacted with a second ring member by means of an annular resilient member which is interposed between the second ring member and a shaft inserted through the roller. The second ring member has a lip portion extending radially inwardly to be in sliding contact with the first ring member so that the lip portion is subject to internal compression stress along the circumferential contacted line thereof. The second ring therefore tends to be waved along the circumferential contacted line, which results in breakage and damage thereto. Moreover, the annular resilient member causes the heat generated in the first ring member due to frictional resistance between the first and second ring members to be prevented from being readily radiated. This also tends to bring about breakage and damage to the first and second ring members.

It is therefore an object of the present invention to provide a sealing mechanism which can prevent such breakages and damages of such first and second ring members and can be used for a long period of time.

In order to achieve the foregoing object, a sealing mechanism according to the present invention is provided to comprise a first member having a conical bore formed in coaxial relation with its own axis and a first face formed at the side thereof; a second member made of a metal and relatively rotatable with respect to the first member, the second member having a second face spaced from and opposing to the first face of the first member, and an annular groove recessed away from and opposing to the conical bore to have a bottom face and radially inner and outer faces connecting the bottom face and the second face; an annular floating seal assembly accommodated in the conical bore of the first member, the annular floating seal assembly including a metal seal ring having a lip portion extending radially outwardly and toward the annular groove, and a resilient annular ring disposed between the conical bore and the seal ring to urge said seal ring toward the annular groove; and a ring member made of a metal and provided in the annular groove to have a rear face in metal-to-metal contact with the bottom face of the annular groove and a fore face in sliding contact with the lip portion of the ring member to complete sealing between the first and second members during relative rotation of the first and second member. The ring member has a central circumferential line equally spaced from the inner and outer peripheral faces thereof and the outer peripheral face of said ring member is in metal-to-metal contact with the radially outer face of the annular groove, and the ring member is in sliding contact with the lip portion of the seal ring of the the floating seal assembly at a circumferential zone between the central circumferential line and the outer peripheral face of the ring member.

The above object, feature and advantage of the present invention will become clear from the following particular description of the invention and the appended claims, taken in conjunction with the accompanying drawings in which;

Figure 1:
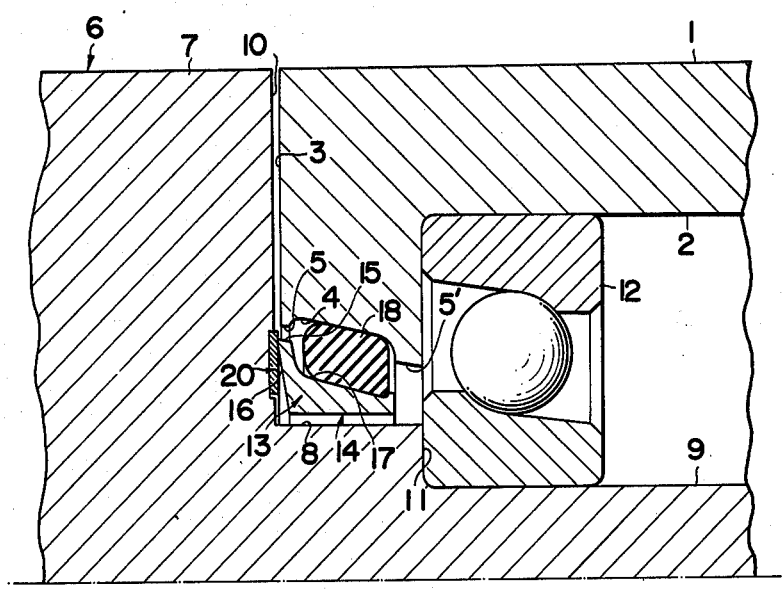
FIG. 1 is a fragmentary cross-sectional view of a preferred embodiment of the sealing mechanism in accordance with the present invention.
Figure 2:
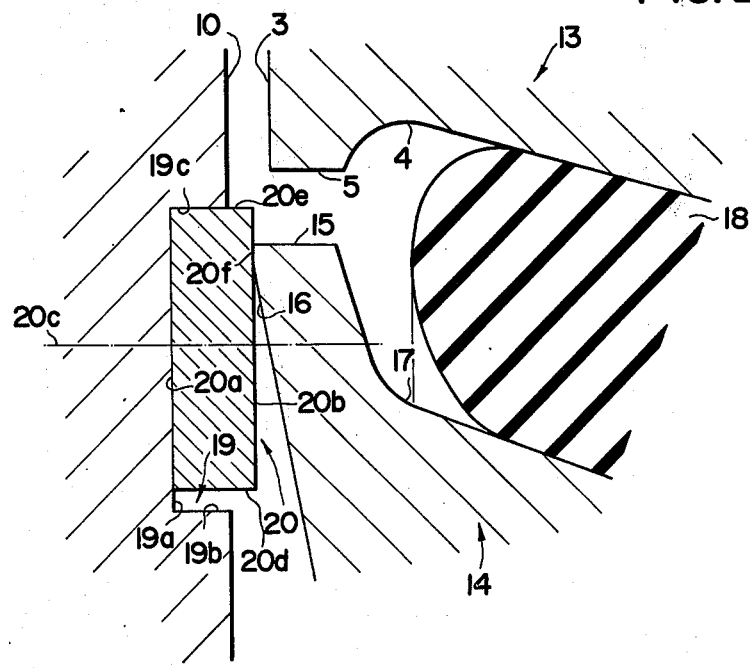
FIG. 2 is an enlarged cross-sectional view around an annular floating seal assembly and a ring member which is in sliding contact with the annular floating seal assembly.

Referring now to the drawings and in particular to FIG. 1, the reference numeral 1 designates a rotary shaft or first member adapted to be driven by a drive source not shown and having an axial bore 2 axially extending therein. The rotary shaft 1 has at its one end a first face 3 perpendicular to a rotational axis thereof and a conical or sealed bore 4 formed in coaxial relation with the rotational axis thereof and extending from the first face 3 toward the axial bore 2 to be connected with the axial bore 2 by an annular ledge. The axial bore 2 is formed larger in diameter than the conical bore 4 which is in turn formed larger at its one end adjacent the first face 3 than the other end adjacent the axial bore 2 so as to have a tapered inner peripheral wall. At the one end and the other end of the inner peripheral wall of the conical bore 4 are provided radially inwardly projected annular protrusions 5 and 5' for retaining during rotation of the rotary shaft 1 a resilient annular ring which will become apparent as the description proceeds. The reference numeral 6 generally indicates a fixed shaft or second member made of a metal such as usual steel, cast steel and the like to be secured to a frame structure not shown. The fixed shaft 6 is formed to have on its periphery a large diameter portion 7, a small diameter portion 9 and an intermediate diameter portion 8 between the large diameter portion 7 and the small diameter portion 9, the intermediate diameter portion 8 having an axial length somewhat larger than that of the conical bore 4. The large diameter portion 7 and the intermediate diameter portion 8 are connected by a second face 10 perpendicular to the rotational axis of the rotary shaft 1, while the intermediate portion 8 and the small diameter portion 9 are also connected by a third face 11 perpendicular to the rotational axis of the rotary shaft 1. The rotary shaft 1 and the fixed shaft 6 are disposed in such an interrelation that the first and second face 3 and 10 are spaced with a small vertical gap, the conical bore 4 is in opposing relation with the intermediate diameter portion 8 to form a first annular gap therebetween, and the axial bore 2 is also in opposing relation with the samll diameter portion 9 to form a second annular gap therebetween. A bearing 12 is accommodated in the second annular gap in abutting relation with the annular ledge of the rotary shaft 1 and the third face 11 to allow the rotary shaft 1 to be rotatably supported by the fixed shaft 6. In the neighbourhood of the bearing 12 is a lubricant for lubricating the bearing 12. An annular floating seal assembly, generally designated at 13, is accommodated in the first annular gap between the conical bore 4 of the rotary shaft 1 and the intermediate diameter portion 8 of the fixed shaft 6 and comprises a seal ring 14 sheathing the intermediate diameter portion 8 with a small annular clearance. The seal ring 14 has a lip portion 15 at its radially outer periphery at the forward end thereof which has an inclined contacting face 16 slightly inclined to the second face 10 to the rotational axis of the rotary shaft 1. The lip portion 15 of the seal ring 14 is adapted to be slidingly contacted with a ring member which will be described hereinlater. The seal ring 14 has a conical outer peripheral wall 17 spaced from and opposing to the inner peripheral wall of the conical bore 4 to form an annular space therebetween and has an annular protrusion at its radially outer end at a position nearest from the bearing 12. The seal ring 14 is preferably made of a cast steel having a characteristic of anti-abrasion and having a hardness of 60 or more in Rockwell hardness. A resilient annular ring 18 is accommodated in the annular space defined between the inner peripheral wall of the conical bore 4 and the conical outer peripheral wall of the seal ring 14 in contact therewith so as to transmit a rotational torque from the rotary shaft 1 to the seal ring 14 while urging the seal ring 14 toward the second face 10 of the fixed shaft 6 with its own resiliency. The material of the annular ring 18 is determined depending upon the characteristic of the lubricant and environmental temperature. As best shown in FIG. 2, an annular groove 19 is formed on the second face 10 of the second member 6 to be recessed away from and opposing to the conical bore 4 and has a bottom face 19a and radially inner and outer faces 19b and 19c connecting the bottom face 19a and the second face 10 of the second member 6. A ring member 20 which is made of a metal such as usual steel is provided in the annular groove 19 in opposing relation with the conical bore 4 to have a rear face 20a in metal-to-metal contact with the bottom face 19a of the annular groove 19 and a fore face 20b in sliding contact with the inclined face 16 of the lip portion 15 of the seal ring 14 to complete sealing between the first and second members 1 and 6 during relative rotation of the first and second members 1 and 6. The ring member 20 has a central circumferential line 20c equally spaced from the inner and outer peripheral faces 20d and 20e thereof and the outer peripheral face 20e of the ring member 20 is adapted to be in metal-to-metal contact with the radially outer face 19c of the annular groove 19 by a shrinkage fit or tight fit. The ring member 20 is in sliding contact with the inclined face 16 of the lip portion 15 of the seal ring 14 at a circumferential zone 20f between the central circumferential line 20c and the outer peripheral face 20e of the ring member 20. The contacted area of the outer peripheral face 20e of the ring member 20 contacted with the radially outer face 19c of the annular groove 19 is larger than the non-contacted area of the outer peripheral face 20e of the ring member 20 not contacted with the radially outer face 19c of the annular groove 19 by the reason that the heat generated in the ring member 20 is readily radiated into the second member 6 to prevent overheating of the ring member 20.

The operation of the sealing mechanism thus constructed will now be described.

The seal ring 14 is forced toward the second face 10 of the fixed shaft 6 by the action of the resiliency of the annular ring 18 interposed between the inner peripheral wall of the conical bore 4 and the outer conical face of the seal ring 14. This causes the contacting face 16 of the lip portion 15 to be brought into pressed and sliding contact with the fore face 20b of the ring member 20.

Under these circumstances, the rotary shaft 1 is rotated through the bearing 12 by the driving source not shown, whereupon the seal ring 14 and the annular ring 18 are rotated in unison with the rotary shaft 1 with frictional resistances caused by the inner peripheral wall of the conical bore 4 and the annular ring 18 and by the outer conical face of the seal ring 14 and the annular ring 18. The lubricant within the space between the axial bore 2 of the rotary shaft 1 and the small diameter portion 9 of the fixed shaft 6 can not be leaked out between the inner peripheral wall of the conical bore 4 and the annular ring 18, between the conical outer face 17 of the seal ring 14 and the annular ring 18, and between the inclined face 16 of the lip portion 15 and the ring member 20. Furthermore, any dust, gravel, soil and the like can also be prevented from entry therebetween.

Although there is frictional heat generated by sliding contact between the seal ring 14 and the ring member 20, the heat is conducted through the ring member 20 to the fixed shaft 6 with large heat capacity and radiation area so that the seal ring 14 is not damaged by the frictional heat.

According to the present invention, the interrelation between the inclined face 16 of the lip portion 15 of the seal ring 14 and the ring member 20 may be made as follows.

Figure 3:
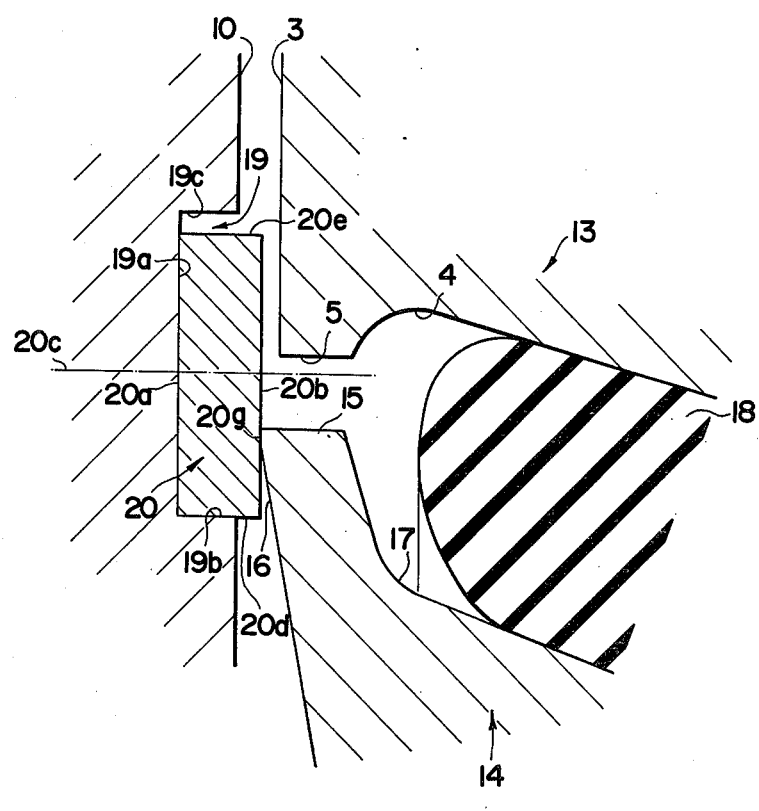
FIG. 3 is an enlarged cross-sectional view similar to FIG. 2 but showing another embodiment of the present invention.

As shown in FIG. 3, the inner peripheral face 20d of the ring member 20 is adapted to be in metal-to-metal contact with the radially inner face 19b of the annular groove 19 by a shrinkage fit or tight fit, the ring member 20 is in sliding contact with the inclined face 16 of the lip portion 15 of the seal ring 14 at a circumferential zone 20g between the central circumferential line 20c and the inner peripheral face 20d of the ring member 20. The contacted area of the inner peripheral face 20d of the ring member 20 contacted with the radially inner face 19b of the annular groove 19 is larger than the non-contacted area of the inner peripheral face 20d of the annular groove 19.

While it has been described that the rotary shaft 1 is rotated and the fixed shaft 6 is stationary, the rotary shaft 1 may be stationarily disposed with the fixed shaft 6 rotated. The shafts 1 and 6 may of course be reversely rotated. According to the present invention, it is necessary that shafts 1 and 6 be relatively rotated. The opposing first and second faces 3 and 10 may be curved or zigzaged.

According to the present invention, the lip portion of the seal ring is adapted to extend radially outwardly in pressed and sliding contact with the ring member so that the lip portion undergoes internal tension stress along the circumferential contacted zone of the seal ring, which makes it possible to prevent the lip portion of the seal ring from being waved along the circumferential contacted zone thereof, resulting in no breakage and damage to the seal ring. Moreover, the heat generated in the ring member can be readily radiated into the second member since the rear face of the ring member is in metal-to-metal contact with the bottom face of the annular groove, which also brings no breakage and damage to the ring member.

Although the particular embodiments of the present invention have been shown and described in the drawings and specification, it will be obvious to those skilled in the art that various changes and modifications may be made without departing from the spirit and scope of the present invention.

What is claimed is:

1. A sealing mechanism, comprising: a first member having a conical bore formed in coaxial relation with its own axis and a first face formed at the side thereof; a second member made of a metal and relatively rotatable with respect to said first member, said second member having a second face spaced from and opposing said first face of said first member, and an annular groove recessed away from and opposing said conical bore and having a bottom face and radially inner and outer faces connecting said bottom face and said second face; an annular floating seal assembly accommodated in said conical bore of said first member, said annular floating seal assembly including a metal seal ring having a lip portion extending radially outwardly and toward said annular groove, and a resilient annular ring disposed between said conical bore and said seal ring to urge said seal ring toward said annular groove; a ring member made of metal and disposed in said annular groove and having a rear face in metal-to-metal contact with said bottom face of said annular groove and a fore face in sliding contact with said lip portion of said metal seal ring to complete sealing between said first and second members during relative rotation of said first and second members, said ring member having inner and outer peripheral faces, characterized in that said ring member has a central circumferential line equally spaced from said inner and outer peripheral faces thereof and said outer peripheral face of said ring member is in metal-to-metal contact with said radially outer face of said annular groove, and that said ring member is in sliding contact with said lip portion of said seal ring of said floating seal assembly at a circumferential zone between said central circumferential line and said outer peripheral face of said ring member, and that the contacted area of said outer peripheral face of said ring member contacted with said radially outer face of said annular groove is larger than the non-contacted area of said outer peripheral face of said ring member not contacted with said radially outer face of said annular groove.

2. A sealing mechanism, comprising: a first member having a conical bore formed in coaxial relation with its own axis and a first face formed at the side thereof; a second member made of a metal and relatively rotatable with respect to said first member, said second member having a second face spaced from and opposing said first face of said first member, and an annular groove recessed away from and opposing said conical bore and having a bottom face and radially inner and outer faces connecting said bottom face and said second face; an annular floating seal assembly accommodated in said conical bore of said first member, said annular floating seal assembly including a metal seal ring having a lip portion extending radially outwardly and toward said annular groove, and a resilient annular ring disposed between said conical bore and said seal ring to urge said seal ring toward said annular groove; and a ring member made of a metal and provided in said annular groove and having a rear face in metal-to-metal contact with said bottom face of said annular groove and a fore face in sliding contact with said lip portion of said metal seal ring to complete sealing between said first and second members during relative rotation of said first and second members, said ring member having inner and outer peripheral faces, characterized in that said ring member has a central circumferential line equally spaced from said inner and outer peripheral faces thereof and said inner peripheral face of said ring member is in metal-to-metal contact with said radially inner face of said annular groove, and that said ring member is in sliding contact with said lip portion of said seal ring of said floating seal assembly at a circumferential zone between said central circumferential line and said inner peripheral face of said ring member, and that said contacted area of said inner peripheral face of said ring member contacted with said radially inner face of said annular groove is larger than the non-contacted area of said inner peripheral face of said ring member not contacted with said radially inner face of said annular groove.

* * * * *